United States Patent [19]

Brefka et al.

[11] Patent Number: 4,636,881
[45] Date of Patent: Jan. 13, 1987

[54] TALKING BOOK WITH AN INFRARED DETECTOR USED TO DETECT PAGE TURNING

[75] Inventors: Paul E. Brefka, Southboro; Klaus R. Pichler, Princeton, both of Mass.

[73] Assignee: James T. Shaw, Sagaponack, N.Y.

[21] Appl. No.: 648,731

[22] Filed: Sep. 10, 1984

[51] Int. Cl.$^4$ .......................... G11B 15/48; G11B 5/06
[52] U.S. Cl. .................................. 360/74.1; 434/317; 369/31; 369/64; 360/12
[58] Field of Search ............... 360/1, 12, 74.1, 74.6, 360/137, 69; 369/31, 32, 63–65, 68, 69, 273; 434/317, 308, 309; 250/221, 561, 571

[56] References Cited

U.S. PATENT DOCUMENTS

| | | | |
|---|---|---|---|
| 3,086,297 | 4/1963 | Kay | 434/317 |
| 3,220,126 | 11/1965 | Gabrielson | 434/317 X |
| 3,396,279 | 8/1968 | Tokuda | 250/221 |
| 3,540,132 | 11/1970 | Glass et al. | 369/69 X |
| 3,641,684 | 2/1972 | Paige | 360/1 X |
| 3,662,078 | 5/1972 | Holiday | 434/317 X |
| 3,738,021 | 6/1973 | Hino et al. | 434/317 |
| 3,808,720 | 5/1974 | Smith | 434/317 X |

Primary Examiner—Raymond F. Cardillo
Assistant Examiner—Steven R. Garland
Attorney, Agent, or Firm—Charles Hieken

[57] ABSTRACT

A talking book includes front and back panels. A microcassette tape player and logical circuitry with left and right infrared detectors are located at the top of the back panel. A ring binder is located at the left of the back panel adjacent the spline and below the left and right infrared detectors. A housing below the ring binder carries an infrared source that energizes the left and right infrared detectors. The housing also carries a headset jack. A conduit located beside the ring binder accommodates wires between the logical circuitry and the housing.

9 Claims, 13 Drawing Figures

TALKING BOOK WITH AN INFRARED DETECTOR USED TO DETECT PAGE TURNING

The present invention relates in general to book talking and more particularly concerns novel apparatus and techniques for allowing a book reader to hear recorded information related to a page being viewed that automatically starts when a page is turned, turns off when the information concerning that page has been broadcast or when the page is turned back.

A search of subclasses 317 and 318 uncovered U.S. Pat. Nos. 2,484,896, 3,086,297, 3,220,126, 3,273,894, 3,529,832, 3,553,851, 3,641,684, 3,744,150, 4,021,982, 4,273,538 and United Kingdom Pat. Nos. 341,146 and 768,936.

It is an important object of the invention to provide an improved talking book.

According to the invention, there is binder means for detachably securing pages of a book for movement along a predetermined page turning path associated with switching means for providing a signal representative of a page being turned and the direction of page turning, such as a ring binder with rings between a source of infrared energy and first and second side-by-side infrared detecting means. There is thus means for supporting the pages or other sensible sheets in noncontacting relationship with the switching means so that moving a page or other sensible sheet between a left pile of sheets and a right pile of sheets over a predetermined turning path established by means for guiding, such as the ring binder, actuates the switching means without effecting mechanical movement of the switching means. Any binder which controls the turning and allows the pages to lie flat is acceptable. Logical circuitry associated with the first and second infrared detecting means sense the order in which the infrared beam is interrupted by page turning to provide a start signal when the page is being turned in a forward direction and a stop signal when the page is being turned in the reverse direction. Recording means for storing and playing back recorded sounds associated with the page being viewed, such as a cassette recorder, responds to the start and stop signals to start and stop, respectively, the recorded information. Preferably, the recorded information includes recorded stop signals, and there is recorded stop signal detecting means for providing a stop signal to said recording means to stop playback at conclusion of playing back information on the page then being viewed until the page is turned and a start signal sensed.

Numerous other features, objects and advantages of the invention will become apparent from the following specification when read in connection with the accompanying drawing in which.

Figure 1:
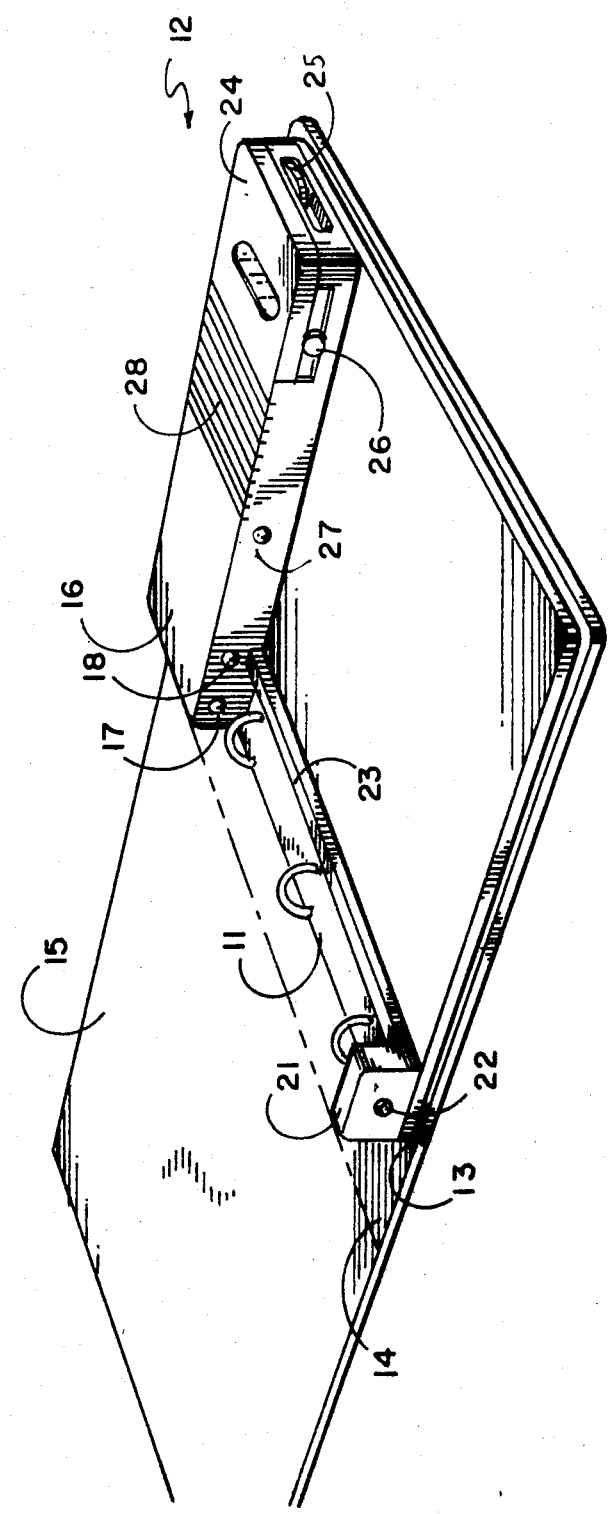
FIG. 1 is a perspective view of an embodiment of the invention having a three-ring binder and recorder.

With reference now to the drawing and more particularly FIG. 1 thereof, there is shown a perspective view of an embodiment of the invention. A three-ring binder 11 carries pages of a book that may be detachably secured therein that a reader may associate with recorded sound information on a cassette in microcassette player 12. The three ring binder 11 is preferably seated on the back cover 13 adjacent the spline 14 so that when front cover 15 overlays back cover 13. Spine 14 is adjacent the left end of microcassette player 12.

Logical circuitry may be supported in left compartment 16 that includes left and right infrared detectors 17 and 18 illuminated by an infrared source in lower housing 21 that also includes a headset jack 22.

A conduit 23 beside ring binder 11 accommodates wires from chamber 16 for headset jack 22 and the infrared source in housing 21.

Cassette player 12 includes a cassette compartment covered by door 24, a volume control 25, an on-off switch 26, an LED tape running indicator light 27 and a speaker 28.

In typical operation the user opens ring binder 11 and inserts a book so that it rests on back panel 13 below mircocassette player 12 and below infrared detector 17 and 18. The user also inserts an associated microcassette in the compartment below door 24. On-off switch 26 may then be turned on to start the player and reproduce sound, such as instructions to insert the book as described above, close the ring binder and adjust volume control 25 to a desired volume level and then turn the first page. At the conclusion of this instruction, the recorded stop signals are sensed to turn off the tape player and extinguish tape running indicator LED 27.

When the user turns the page, first infrared energy to detector 18 and then to detector 17 is interrupted so that the logical circuitry determines that the page is being turned in the forward direction to provide a start pulse that turns on microcassette recorder 12 and illuminates LED 27, running continuing until the occurrence of the stop code at the end of the message on that page, usually occurring after a spoken instruction to turn to page (the next number). If the user turns a page in the reverse direction, energy is interrupted to detector 17 before detector 18 to cause the associated logical circuitry to provide a stop signal that stops microcassette tape player 12 and extinguishes LED 27. Turning the page in the forward direction causes microcassette player 12 to resume playing.

Figure 2:
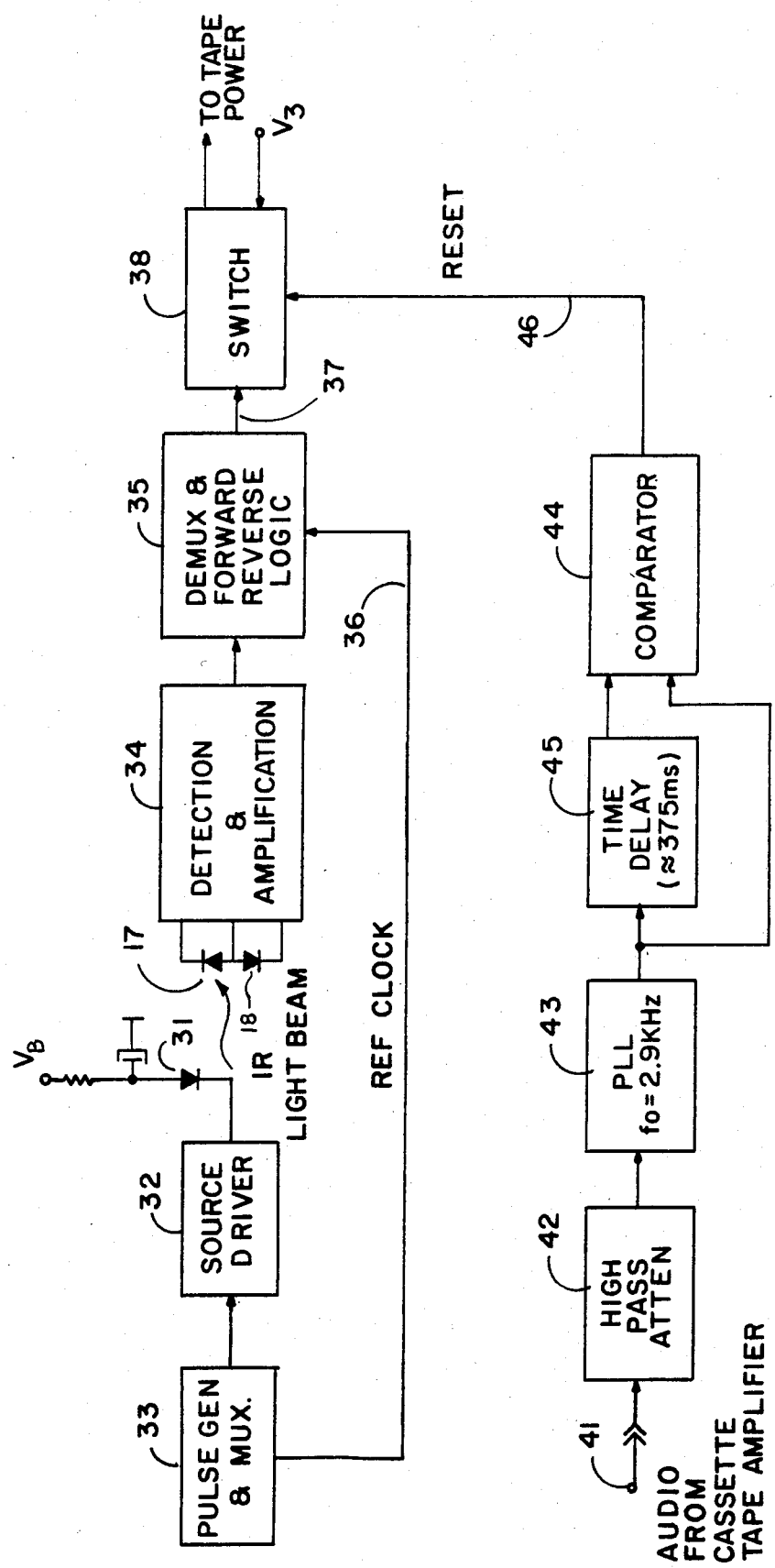
FIG. 2 is a block diagram illustrating the logical arrangement of a system according to the invention.

Referring to FIG. 2, there is shown a block diagram illustrating the logical arrangement of a system according to the invention. An infrared LED 31 illuminates left and right infrared detectors 17 and 18, respectively, and has its anode connected to the ungrounded battery terminal $V_D$ to conduct when source driver 32 is turned on by pulse generator and multiplexer 33. Detection and amplification circuitry 34 detects the signals sensed by infrared detectors 17 and 18 and delivers the detected signals to demultiplexing and forward and reverse logic circuitry 36 that receives reference clock pulses from pulse generator multiplexer 33 to provide start and stop signals on output 37 to switch 38 when a page is turned forward and backward, respectively. Switch 38 responds to a start signal on output 37 by closing to connect battery terminal $V_D$ to power microcassette player 12. A stop signal on output 37 opens switch 38.

Input 41 receives the audio signal from the amplifier of microcassette player 12. High pass attenuator 42 has a cutoff typically just above 3 kHz and transmits tones of typically 2.9 kHz to phase locked loop 43 that provides an output signal upon the occurrence of such a pulse directly to one input of comparator 44 and through a delay network 45 to a second input that furnishes a delay typically of 375 milliseconds, the spacing between successive 2.9 kHz tone pulses of this delay interval forming the stop code at the end of each recorded message. The first pulse delayed and the second direct pulse simultaneously energize both inputs of comparator 44 to provide a reset signal on line 46 to switch 38 that opens switch 38 and interrupts power to microcassette player 12.

Referring to FIGS. 3A-3J, there is shown a timing diagram of the system of FIG. 2 helpful in understanding system operation. Pulse generator 33 provides the clock pulses of FIG. 3A to source driver 32 that responds to each trailing edge of a clock pulse to provide a transmit drive pulse shown in FIG. 3C that pulses infrared LED 31. Multiplex signal 3B provided by pulse generator and multiplexer 33 is basically the clock signal of FIG. 3A divided by two and is applied as a reference signal on line 36.

Figure 3:
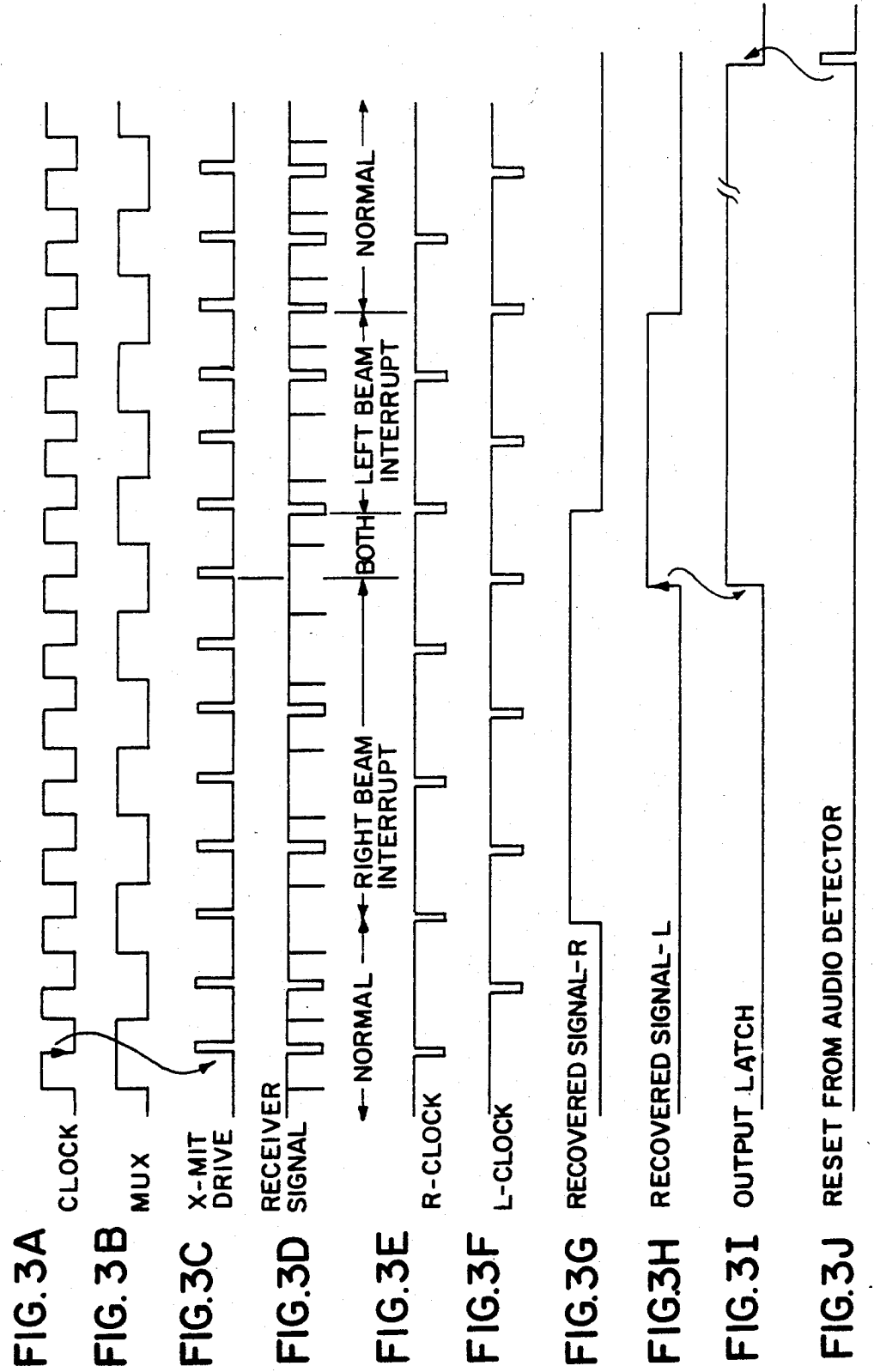
FIGS. 3A-3J show a timing diagram of the light beam circuit with a graphical representation of signal waveforms plotted to a common time scale.

The multiplexer signal of FIG. 3B is used to provide a right or R clock pulse when positive and a left or L clock pulse when negative as shown in FIGS. 3E and 3F respectively. The receiver signal shown in FIG. 3D provided by detection and amplification circuitry 34 is thus shown in FIG. 3D and includes pulses in both right and left intervals coincident with right and left clock pulses shown in FIGS. 3E and 3F, respectively, during the intervals designated normal. However, during the interval designated right beam interrupt, only pulses coincident with left clock pulse are received, and during the intervals designated left beam interrupt, only the pulses coincident with the right clock pulses of FIG. 3 are received.

Demultiplexing and forward reverse logic circuitry 35 is low until it receives an R-clock pulse without a received signal and remains high until both pulses are again coincident as shown in FIG. 3G. Similarly the recovered left signal, or signal-L shown in FIG. 3H, remains low until an L-clock pulse occurs without left detector 17 receiving a transmitted pulse. Upon the occurrence of this transition signifying that the beam to right detector 18 has been interrupted before left detector 17, output latch signal of switch 38 shown in FIG. 3I assumes the high or closed condition until comparator 44 provides the signal on line 46 shown in FIG. 3J to open switch 38.

While not shown in the timing diagram, it will be recognized that the occurrence of a left beam interrupt before a right beam interrupt will produce a rising transition in the recovered signal L of FIG. 3H before the rising transition of the recovered signal R in FIG. 3G so that upon the occurrence of such a condition, output latch signal 3I shifts to the low or open condition to interrupt power to player 12 as described above.

Figure 4:
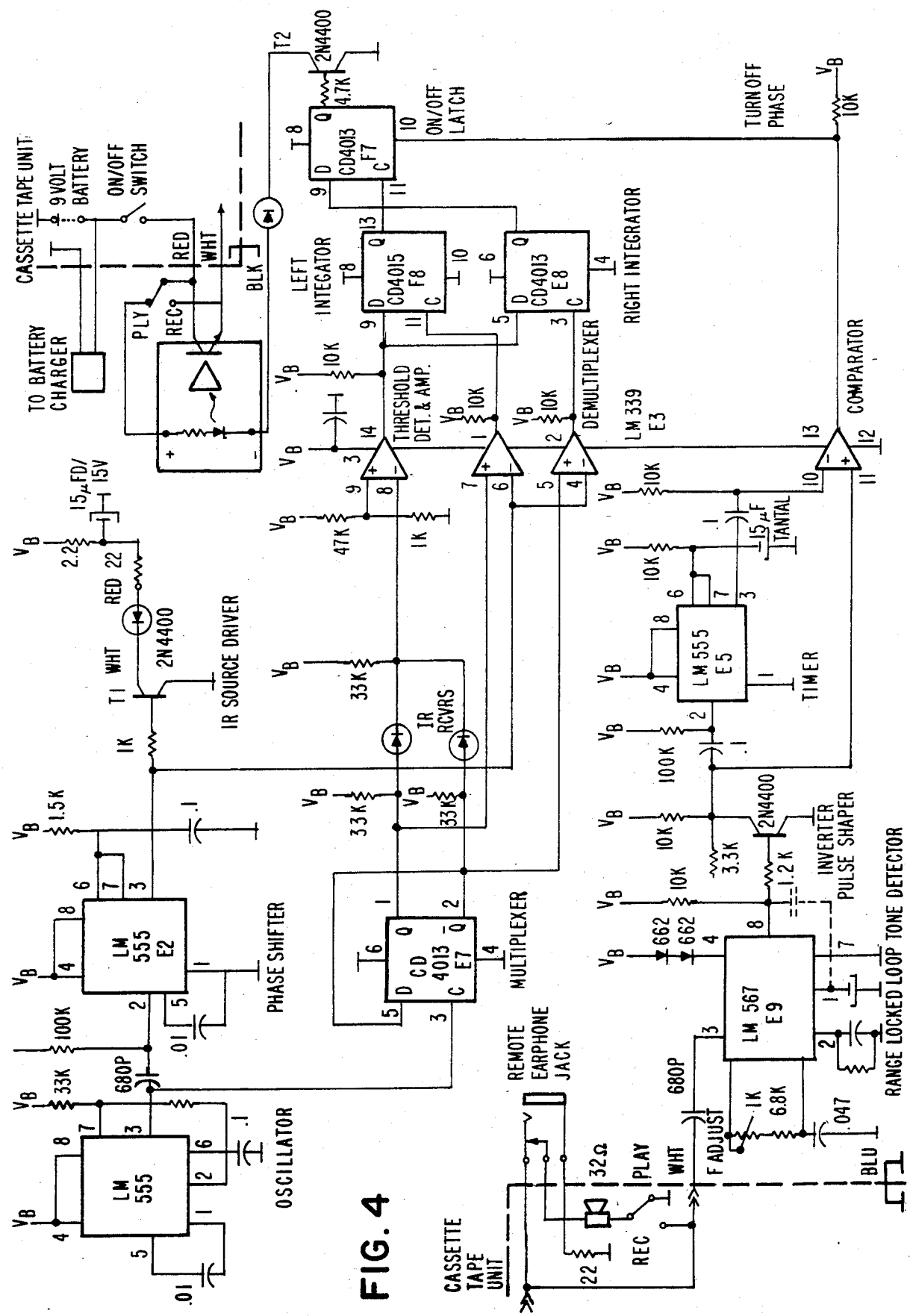
FIG. 4 is a schematic circuit diagram of an exemplary embodiment of the invention with specific component values that should enable anyone having ordinary skill in the art to practice the invention by constructing the embodiment there shown.

Referring to FIG. 4, there is shown a schematic circuit diagram of an exemplary embodiment of the invention with parameter values embodying the block diagram of FIG. 2.

Other specific circuitry for performing the functions described above is well-known in the art and may embody the invention. One skilled in the art should be able to practice the invention by constructing the embodiment there shown. The specific circuits there shown are conventional. Some comments may be helpful in understanding the principles of the invention.

The phase locked loop tone detector may include the resistor-capacitor circuit shown connected in by dotted lines as an option for minimizing chatter. The resistor shown connected by a dotted line to terminal 2 of the phase locked loop tone detector IC is optional and serves to skew the frequency detection band. The photooptically coupled power switch may be a Teledyne solid state relay Part No. 671-22.

The invention has a number of advantages. The same basic structure may be used to accommodate a wide variety of books with associated cassettes for a wide variety of purposes. For example, the invention may be used to teach Braille to the blind. It may be used to teach children about sounds associated with pictures being viewed, for example, bird or animal sounds. It may be used to teach technicians how to service equipment.

Variations in embodying the invention may be practiced by those skilled in the art. For example, other switching techniques may be used, for example having left and right microswitches that are activated as the pages move by. The reset signal or stop code may be implemented by optically or mechanically sensing a punched hole in the recording medium that signifies the end of a block of information. Other forms of recorders may be employed. Other forms of detachably securing book pages may be used. A General Electric Model 3-5333 microcassette recorder may be used as the playback means.

It is evident that those skilled in the art may now make numerous other uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for providing recorded audible messages related to material being observed on sensible sheets comprising, means for detachably securing said sensible sheets, playback means for audibly reproducing sound messages recorded on a recording medium, means for supporting said playback means and said means for detachably securing said sensible sheets in fixed relationship, said means for detachably securing allowing easily turning said sheets as in a book to allow said sheets to exchange places between a left pile of sheets and a right pile of sheets and having means for guiding said sheets over a predetermined turning path when moving between said left and right piles, switching means in fixed relationship to said playback means and said means for detachably securing for providing at least a start signal when a sensible sheet moves from one of said piles to the other, said switching means comprising left and right switching means for being activated in sequence when a sheet moves over said predetermined turning path from one pile of the other.

and logical circuit means coupled to said left and right switching means for providing said start signal only when said sheet moves in a predetermined forward direction from one of said piles to the other, said logical circuit means further including means responsive to a sheet moving in a predetermined backward direction from said other of said piles to said one of said piles for providing a stop signal, means responsive to said stop signal for disabling said playback means and interrupting the production of audible sounds, and means responsive to said start signal for activating said playback means to produce audible sound associated with a sheet.

2. Apparatus in accordance with claim 1 wherein said switching means further comprises a source of infrared energy and infrared energy detecting means, said source of infrared energy and said infrared energy detecting means being separated by said predetermined turning path so that the infrared energy beam therebetween is interrupted only when a sensible sheet moves over said predetermined turning path, said infrared energy detecting means including left and right infrared detecting means for sensing the direction of sheet movement.

3. Apparatus in accordance with claim 1 and further comprising, means for receiving an audio signal from said playback means that may carry a stop code signal representative of the end of a message associated with a sheet being sensed, means responsive to said stop code signal for providing a stop signal, and means responsive to said stop signal for disabling said playback means and terminating the provision of audible sound therefrom.

4. Apparatus for providing recorded audible messages related to material being observed on sensible sheets in accordance with claim 1 and further comprising means for supporting said switching means in noncontacting relationship with said sheets, whereby movement of a sensible sheet from one of said piles to the other activates said switching means without producing mechanical movement of said switching means.

5. Apparatus in accordance with claim 1 wherein said means for detachably securing comprises a ring binder.

6. Apparatus in accordance with claim 5 wherein said playback means comprises a cassette tape player.

7. Apparatus for providing recorded audible messages related to material being observed on sensible sheets comprising, means for detachably securing said sensible sheets, playback means for audibly reproducing sound messages recorded on a recording medium, means for supporting said playback means and said means for detachably securing said sensible sheets in fixed relationship, said means for detachably securing allowing easily turning said sheets as in a book to allow said sheets to exchange places between a left pile of sheets and a right pile of sheets and having means for guiding said sheets over a predetermined turning path when moving between said left and right piles, switching means in fixed relationship to said playback means and said means for detachably securing for providing at least a start signal when a sensible sheet moves from one of said piles to the other, said switching means comprising a source of infrared energy and infrared energy detecting means, said source of infrared energy and said infrared energy detecting means being separated by said predetermined turning path so that the infrared energy beam therebetween is interrupted only when a sensible sheet moves over said predetermined path, said switching means further comprising left and right switching means for being activated in sequence when a sheet moves over said predetermined turning path from one pile to the other, logical circuit means coupled to said left and right switching means for providing said start signal only when said sheet moves in a predetermined forward direction from one of said piles to the other, and means responsive to said start signal for activating said playback means to produce audible sound associated with a sheet.

8. Apparatus for providing recorded audible messages related to material being observed on sensible sheets comprising, means for detachably securing said sensible sheets, playback means for audibly reproducing sound messages recorded on a recording medium, means for supporting said playback means and said means for detachably securing said sensible sheets in fixed relationship, said means for detachably securing allowing easily turning said sheets as in a book to allow said sheets to exchange places between a left pile of sheets and a right pile of sheets and having means for guiding said sheets over a predetermined turning path when moving between left and right piles, switching means in fixed relationship to said playback means and said means for detachably securing for providing at least a start signal in response to movement of a sensible sheet from one of said piles to the other pile without producing any movement of the switching means, means responsive to said start signal for activating said playback means to produce audible sound associated with a sheet, and means for supporting said switching means in noncontacting relationship with said sheets.

9. Apparatus for providing recorded audible messages related to material being observed on sensible sheets in accordance with claim 8, said switching means comprising left and right switching means for being activated in sequence when a sheet moves over said predetermined turning path from one pile to the other and further comprising, logical circuit means coupled to said left and right switching means for providing said start signal only when said sheet moves in a predetermined forward direction from one of said piles to the other.

* * * * *